US010912995B2

(12) United States Patent
Buritica Suarez et al.

(10) Patent No.: US 10,912,995 B2
(45) Date of Patent: Feb. 9, 2021

(54) SYSTEM AND METHOD FOR EMULATING AN ELECTRONIC GAME TO PLAY IN A PHYSICAL GAMING ENVIRONMENT

(71) Applicant: Ivan Mauricio Buritica Suarez, Bogota (CO)

(72) Inventors: Ivan Mauricio Buritica Suarez, Bogota (CO); Juan Carlos Linares Garzon, Bogota (CO)

(73) Assignee: Ivan Mauricio Buritica Suarez, Bogota (CO)

( * ) Notice: Subject to any disclaimer, the term of this patent is extended or adjusted under 35 U.S.C. 154(b) by 0 days.

(21) Appl. No.: 16/155,445

(22) Filed: Oct. 9, 2018

(65) Prior Publication Data

US 2020/0108311 A1    Apr. 9, 2020

(51) Int. Cl.
*A63F 9/24*  (2006.01)
*A63F 13/31* (2014.01)
*A63F 13/20* (2014.01)

(52) U.S. Cl.
CPC .............. *A63F 13/31* (2014.09); *A63F 13/20* (2014.09)

(58) Field of Classification Search
CPC .... A63F 13/211; A63F 13/20; A63F 2300/69; A63F 13/31
See application file for complete search history.

(56) References Cited

U.S. PATENT DOCUMENTS 5,853,327 A * 12/1998 Gilboa ................ A63F 3/00643
                                                  463/39
7,397,464 B1 * 7/2008 Robbins ................ G06F 3/0425
                                                  345/156

(Continued)

*Primary Examiner* — Steve Rowland
(74) *Attorney, Agent, or Firm* — Ziegler IP Law Group, LLC

(57) ABSTRACT

A gaming system including a computing arrangement that is connected, when in operation, via a data communication network arrangement to an environmental unit and at least one gaming device that is spatially local to the environmental unit, characterized in that the gaming system is implemented in an environment to emulate an electronic game to play in a physical gaming environment by its one or more users, wherein the gaming system is arranged such that: (i) the at least one gaming device includes a first sensing arrangement for sensing a first information comprising inputs from at least user while playing the electronic game and generating at least one first event by processing the first information, (ii) the environmental unit includes a second sensing arrangement for sensing a second information associated with the at least one gaming device while playing the electronic game and generating at least one second event by processing the second information associated with the at least one gaming device, wherein the at least one first event and the at least one second event are provided as input to the computing arrangement and (iii) the computing arrangement including a processor that, when in operation, implements a set of first rules to: determine a modification to at least one of: (a) a first parameter by processing the at least one first event, or (b) a second parameter by processing the at least one second event, based on a set of second rules of the electronic game; and generate commands to implement modifications to at least one of: (a) the first parameter in the at least one gaming device, or (b) the second parameter in the environmental unit for compensating at least one element of the gaming system for a predefined period of time and for enabling the at least one user to play the electronic game in the physical gaming environment with the improved user experience.

12 Claims, 9 Drawing Sheets

(56) References Cited

U.S. PATENT DOCUMENTS

| | | | | |
|---|---|---|---|---|
| 8,821,260 | B1* | 9/2014 | DeSanti | A63F 13/69 |
| | | | | 463/25 |
| 2001/0034257 | A1* | 10/2001 | Weston | A63F 13/86 |
| | | | | 463/1 |
| 2002/0090985 | A1* | 7/2002 | Tochner | A63F 13/12 |
| | | | | 463/1 |
| 2004/0092311 | A1* | 5/2004 | Weston | A63F 13/95 |
| | | | | 463/42 |
| 2006/0154726 | A1* | 7/2006 | Weston | A63H 30/04 |
| | | | | 463/37 |
| 2007/0167239 | A1* | 7/2007 | O'Rourke | G07F 17/32 |
| | | | | 463/42 |
| 2007/0211047 | A1* | 9/2007 | Doan | A63F 1/04 |
| | | | | 345/419 |
| 2009/0005167 | A1* | 1/2009 | Arrasvuori | A63H 33/042 |
| | | | | 463/40 |
| 2009/0007186 | A1* | 1/2009 | Hartwell | A63F 13/12 |
| | | | | 725/62 |
| 2009/0017913 | A1* | 1/2009 | Bell | H04W 4/029 |
| | | | | 463/40 |
| 2009/0197658 | A1* | 8/2009 | Polchin | A63F 13/02 |
| | | | | 463/9 |

* cited by examiner

SYSTEM AND METHOD FOR EMULATING AN ELECTRONIC GAME TO PLAY IN A PHYSICAL GAMING ENVIRONMENT

TECHNICAL FIELD

The present disclosure relates generally to electronic games, and more specifically, a gaming system that is implemented in an environment to emulate an electronic game to play in a physical gaming environment by one or more users. Moreover, the aforesaid gaming system implements a set of first rules for compensating at least one element of the gaming system while playing the electronic game in the physical gaming environment.

BACKGROUND

The gaming industry has experienced an explosive growth during the last few years. Different types of video games have been provided, which provide a gaming environment that enables the player to control a game character or other movable element to perform various stunts or moves during the game. An evolution has occurred starting from the electronic games characterized by limited computational resources and poor graphics to the current gaming trends dominated by virtual reality and augmented reality. The augmented reality includes a meshing of real-life experience with a virtual experience. Although significant developments have been made to immerse the players into the game reality through headsets and other electronic tools, there are still significant limitations to these technologies. One fundamental drawback is the requirement of headsets, which often cause dizziness.

Therefore, there arises a need to address the aforementioned technical drawbacks in existing technologies due to limitations in the movement of the players and requirement of the use of the electronic tools which often cause dizziness or other physical problems while playing the game.

SUMMARY

The present disclosure seeks to provide an improved system that, when in operation, emulates an electronic game in a physical gaming environment for enabling at least one user to play the electronic game in the physical gaming environment with the improved user experience.

According to a first aspect, there is provided a gaming system including a computing arrangement that is connected, when in operation, via a data communication network arrangement to an environmental unit and at least one gaming device that is spatially local to the environmental unit, characterized in that the gaming system is implemented in an environment to emulate an electronic game to play in a physical gaming environment by its one or more users, wherein the gaming system is arranged such that:
  (i) the at least one gaming device includes a first sensing arrangement for sensing a first information comprising inputs from at least user while playing the electronic game and generating at least one first event by processing the first information;
  (ii) the environmental unit includes a second sensing arrangement for sensing a second information associated with the at least one gaming device while playing the electronic game and generating at least one second event by processing the second information associated with the at least one gaming device, wherein the at least one first event and the at least one second event are provided as input to the computing arrangement; and
  (iii) the computing arrangement including a processor that, when in operation, implements a set of first rules to:
    determine a modification to at least one of:
      (a) a first parameter by processing the at least one first event, or
      (b) a second parameter by processing the at least one second event, based on a set of second rules of the electronic game; and
    generate commands to implement modifications to at least one of:
      (a) the first parameter in the at least one gaming device, or
      (b) the second parameter in the environmental unit for compensating at least one element of the gaming system for a predefined period of time and for enabling the at least one user to play the electronic game in the physical gaming environment with the improved user experience.

Optionally, in the gaming system, the processor predefines a set of first parameters for the at least one gaming device and a set of second parameters for the environment unit and wherein the processor enables the set of first parameters, the set of second parameters, the first sensing arrangement and the second sensing arrangement in a standby mode before the electronic game starts.

Optionally, in the gaming system, the second sensing arrangement is implemented in a plurality of zones of the physical gaming environment and wherein each of the plurality of zones comprises at least one sensor that detects a physical parameter of the at least one gaming device or the at least one user to generate the second information.

Optionally, in the gaming system, the set of first rules implement a set of modes from the electronic game into the physical gaming environment.

Optionally, in the gaming system, the processor enforces the set of second rules of the electronic game and monitors a progress of the electronic game to determine a winner of the electronic game.

Optionally, in the gaming system, the second information comprises at least one of a speed, a position or a status of the at least one gaming device.

Optionally, in the gaming system, the first parameter comprises a parameter associated with the at least one element of the gaming system and the element comprises at least one of at least one of speed, gun, shield, power, attack or defense items or rewards.

Optionally, in the gaming system, the second parameter comprises an environmental parameter associated with the physical gaming environment.

Optionally, in the gaming system, the at least one gaming device comprises a display that indicates whether the at least one user has been provided a new element or penalized when the at least one user fell into a trap.

Optionally, in the gaming system, the processor synchronizes the first event and the second event.

Optionally, in the gaming system, the set of first rules are programmable according to the electronic game.

According to a second aspect, there is provided a method of using a gaming system, the method comprising:
  arranging at least one gaming device to include a first sensing arrangement for sensing a first information comprising inputs from at least one user while playing an electronic game and generating at least one first event by processing the first information;

arranging an environmental unit to include a second sensing arrangement for sensing a second information associated with the at least one gaming device while playing the electronic game and generating at least one second event by processing the second information associated with the at least one gaming device, wherein the at least one first event and the at least one second event are provided as input to a computing arrangement; and arranging the computing arrangement to include a processor that, when in operation, implements a set of first rules to:

determine a modification to at least one of:
  (a) a first parameter by processing the at least one first event, or
  (b) a second parameter by processing the at least one second event, based on a set of second rules of the electronic game; and generate commands to implement modifications to at least one of:
  (a) the first parameter in the at least one gaming device, or
  (b) the second parameter in the environmental unit to assign a level to at least one element of the gaming system for a predefined period of time and to enable the at least one user to play the electronic game in a physical gaming environment with the improved user experience.

According to a third aspect, there is provided a computer program product comprising a non-transitory computer-readable storage medium having computer-readable instructions stored thereon, the computer-readable instructions being executable by a computerized device comprising processing hardware to execute the above method.

According to a fourth aspect, there is provided a gaming system including a computing arrangement for implementing a set of first rules for compensating at least one element of gaming system, characterized in that the computing arrangement comprising:

a processor that implements a set of first rules, when in operation, to:

implement a set of modes from an electronic game into a physical gaming environment;

determine, based on a set of second rules of the electronic game, a modification to at least one of:
  (a) a first parameter by processing at least one first event, wherein the at least one first event is generated by processing a first information that is sensed by a first sensing arrangement of the at least one gaming device, or
  (b) a second parameter by processing at least one second event, wherein the at least one second event is generated by processing a second information that is sensed by a second sensing arrangement of an environmental unit; and generate commands to implement modifications to at least one of:
  (a) the first parameter in the at least one gaming device, or
  (b) the second parameter in the environmental unit to compensate the at least one element of the gaming system for a predefined period of time and to enable the at least one user to play the electronic game in the physical gaming environment with the improved user experience.

Optionally, in the gaming system, the set of first rules are programmable according to the electronic game.

It will be appreciated that the aforesaid present method is not merely a "method of playing a game" as such, "software for a computer, as such", "methods of doing a mental act, as such", but has a technical effect in that the method employs a gaming system that is implemented in an environment to emulate an electronic game to play in a physical gaming environment by at least one user and functions as a form of technical control for controlling the electronic game while playing; the method involves building an artificially intelligent gaming system to address, for example to solve, the technical problem of emulating the electronic game in the physical gaming environment for playing by the at least one user and compensating at least one element of the gaming system for enabling the at least one user to play the electronic game in the physical gaming environment with the improved user experience.

Further, the compensating the at least one element of the gaming system may cause a hardware reconfiguration of the gaming system, for example selectively switches in additional processor capacity and/or more data memory capacity and/or different types of graphic processor chip, and the hardware reconfiguration or hardware status is regarded as being technical in nature. Thus, to consider the method of the present disclosure to be subject matter that is excluded from patentability would be totally inconsistent with EPO and UKIPO practice in respect of inventions that are technically closely related to embodiments described in the present disclosure.

Embodiments of the present disclosure substantially eliminate or at least partially address the aforementioned existing technologies due to limitations in the movement of the users and requirement of the use of the electronic tools which often cause dizziness or other physical problems while playing the game.

Additional aspects, advantages, features and objects of the present disclosure are made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
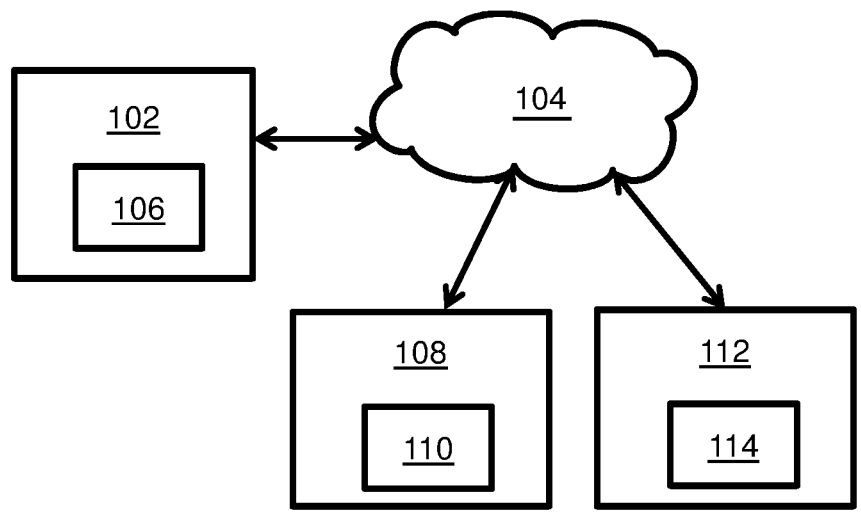
FIG. 1 is a schematic illustration of a gaming system in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

According to a first aspect, there is provided a gaming system including a computing arrangement that is connected, when in operation, via a data communication network arrangement to an environmental unit and at least one gaming device that is spatially local to the environmental unit, characterized in that the gaming system is implemented in an environment to emulate an electronic game to play in a physical gaming environment by its one or more users, wherein the gaming system is arranged such that:

(i) the at least one gaming device includes a first sensing arrangement for sensing a first information comprising inputs from at least user while playing the electronic game and generating at least one first event by processing the first information;

(ii) the environmental unit includes a second sensing arrangement for sensing a second information associated with the at least one gaming device while playing the electronic game and generating at least one second event by processing the second information associated with the at least one gaming device, wherein the at least one first event and the at least one second event are provided as input to the computing arrangement; and (iii) the computing arrangement including a processor that, when in operation, implements a set of first rules to:
  determine a modification to at least one of:
    (a) a first parameter by processing the at least one first event, or
    (b) a second parameter by processing the at least one second event, based on a set of second rules of the electronic game; and generate commands to implement modifications to at least one of:
  (a) the first parameter in the at least one gaming device, or
  (b) the second parameter in the environmental unit for compensating at least one element of the gaming system for a predefined period of time and for enabling the at least one user to play the electronic game in the physical gaming environment with the improved user experience.

The present gaming system, when in operation, thus emulates the electronic game in the physical gaming environment and enables the at one user to play the electronic game in the physical gaming environment without limiting the movements of the players and/or requiring more electronic tools. The present gaming system thus provides an improved user experience to the at least one user when playing the electronic game in the physical gaming environment. The present gaming system thus implements the set of second rules and elements of the electronic game to recreate the electronic game in the physical gaming environment. The present gaming system thus implements the set of first rules to assign or strength an element (e.g. a tool) of the gaming system when playing, which enables a unique compensation to make the electronic game more competitive or to improve the skills of the at least one user (e.g. a player). The present gaming system may emulate a visual experience and provide it in the real physical gaming environment, and not through a screen, a monitor or an Augmented/virtual reality headset.

In embodiments of the present disclosure, the at least one user may play the electronic game using the at least one gaming device by riding and/or interacting with it. Optionally, the at least one gaming device may be wearable device, for example a wrist watch, which is worn by the at least one user while playing the electronic game. For example, if the electronic game is a running game, the at least one user may wear/carry a device having a speed sensor or a camera which measure a speed at which a user is running. The first sensing arrangement may sense the first information when the at least one user interacts with the at least one gaming device. Optionally, the first sensing arrangement may comprise at least one of an accelerometer, a gesture sensor, a gyroscopic sensor, an actuator etc[A1]. In an embodiment, the first sensing arrangement comprises a camera or a smart watch that may be associated with the at least one gaming device for sensing the first information. For example, the first sensing arrangement may sense physical parameter (e.g. a physical motion or an activity) of the at least one gaming device (e.g. while playing kart/car racing games) or the at least one user (e.g. while playing kick boxing) to generate the first information.

The at least one gaming device may comprise a first microprocessor that processes the first information to generate the at least one first event. Optionally, the at least one gaming device comprises a first communication module to communicate the at least one first event to the computing arrangement through the data communication network. The at least one gaming device, without limitation, may be selected from a car, a kart, a two-wheeler, a bicycle, a gun, a locomotive device or any other type of gaming device. In an embodiment, the data communication network is a wired network. In another embodiment, the data communication network is a wireless network.

Optionally, the second sensing arrangement senses the second information associated with the at least one gaming device when the at least one player plays the electronic game in the physical gaming environment using the at least one gaming device. The second sensing arrangement may comprise at least one of a speed sensor, a position sensor, an environment sensor, etc. Optionally, the second sensing arrangement may comprise a plurality of sensors that are implement in a plurality of zones of the physical gaming environment for sensing a speed, a movement, a position of the at least one gaming device, etc.

Optionally, the environmental unit comprises a second microprocessor that generates at least one second event by processing the second information associated with the at least one gaming device. Optionally, the environmental unit comprises a second communication module to communicate the at least one second event to the computing arrangement through the data communication network. The computing arrangement may comprise a third communication module to receive the at least one first event and the at least one second event through the data communication network.

Optionally, the set of first rules comprises compensation rules which are implemented in the gaming system to compensate an element or a tool of the gaming system based on a status of the electronic game to make the electronic game more competitive. The computing arrangement may communicate the commands, using the third communication module, to the at least one gaming device and the environmental unit through the data communication network. The commands may comprise a set of instructions to implement modifications to the first parameter and the second parameter. The computing arrangement, without limitation, may be selected from a mobile phone, a Personal Digital Assistant, a tablet, a desktop computer, a laptop, an electronic notebook or a smartphone.

Further, the compensating the at least one element of the gaming system may cause a hardware reconfiguration of the gaming system, for example selectively switches in additional processor capacity and/or more data memory capacity and/or different types of graphic processor chip, and the hardware reconfiguration or hardware status is regarded as being technical in nature.

According to an embodiment, the processor predefines a set of first parameters for the at least one gaming device and a set of second parameters for the environment unit and wherein the processor enables the set of first parameters, the set of second parameters, the first sensing arrangement and the second sensing arrangement in a standby mode before the electronic game starts.

According to another embodiment, characterized in that the second sensing arrangement is implemented in a plurality of zones of the physical gaming environment and wherein each of the plurality of zones comprises at least one sensor that detects a physical parameter of the at least one gaming device or the at least one user to generate the second information. The physical parameter may comprise a physical motion or an activity of the at least one gaming device or the at least one user across the plurality of zones. For example, in a kart game, the at least one gaming device moves across the plurality of zones and when the at least one gaming device moves from a first zone to a second zone, a speed of the at least one gaming device is calculated based a distance between the first zone and the second zone and a time taken by the at least one gaming device to move from the first zone to the second zone. In virtual reality environment, the physical parameters of the at least one gaming device or the at least one user such as a physical motion or an activity are sensed to control the electronic game. Whereas, in the physical gaming environment, the physical parameters of the at least one gaming device or the at least one user are sensed and commands are generated to modify a parameter of the at least one gaming device, which is completely different from the virtual reality.

According to yet another embodiment, the set of first rules implement a set of modes from the electronic game into the physical gaming environment. The set of modes may comprise a plurality of playing modes or a plurality of playing level of the electronic game.

According to yet another embodiment, the processor enforces the set of second rules of the electronic game and monitors a progress of the electronic game to determine a winner of the electronic game. The set of second rules may comprise one or more rules of the electronic games that need to be implemented/followed while playing.

According to yet another embodiment, the second information comprises at least one of a speed, a position or a status of the at least one gaming device.

According to yet another embodiment, the first parameter comprises a parameter associated with the at least one element of the gaming system and the element comprises at least one of speed, gun, bat, ball, shield, power, attack or defense items or rewards. The parameter associated with the at least one element may comprise at least one of increasing or decreasing a level, a strength, or a force of the at least one element. [A2] For example, if the at least one user reaches a partial milestone in the electronic game, additional strength (e.g. the first parameter) may be provided to the at least one gaming device associated with the at least one user to boost up his/her element (e.g. a tool). In an embodiment, the element comprises, but not limited to, a power up to help the at least one user to boost a speed of the at least one gaming device or a reward for solving a puzzle (e.g. a key) to open a door/an element in the physical gaming environment. The at least one element may improve an overall gaming experience of the user and may be used for changing environments conditions while playing the electronic game in the physical gaming environment. In an embodiment, the power of the at least one element diminishes for a period of time when the at least one user is executing the electronic game in certain conditions within the physical gaming environment, based on the second rules of the electronic game.

According to yet another embodiment, the second parameter comprises an environmental parameter associated with the physical gaming environment. The environmental parameter may comprise increasing or reducing an allocated time, enforcing speed zones, reducing or increasing a speed of the at least gaming device with the help of speed zones[A3].

According to yet another embodiment, the at least one gaming device comprises a display that indicates whether the at least one user has been provided a new element or penalized when the at least one user fell into a trap. The display may also indicate a score of the at least one user.

According to yet another embodiment, the processor synchronizes the first event and the second event.

According to yet another embodiment, that the set of first rules are programmable according to the electronic game.

According to a second aspect, there is provided a method of using a gaming system, the method comprising:

arranging at least one gaming device to include a first sensing arrangement for sensing a first information comprising inputs from at least one user while playing an electronic game and generating at least one first event by processing the first information;

arranging an environmental unit to include a second sensing arrangement for sensing a second information associated with the at least one gaming device while playing the electronic game and generating at least one second event by processing the second information associated with the at least one gaming device, wherein the at least one first event and the at least one second event are provided as input to a computing arrangement; and arranging the computing arrangement to include a processor that, when in operation, implements a set of first rules to:

determine a modification to at least one of:
(a) a first parameter by processing the at least one first event, or
(b) a second parameter by processing the at least one second event, based on a set of second rules of the electronic game; and generate commands to implement modifications to at least one of:
(a) the first parameter in the at least one gaming device, or
(b) the second parameter in the environmental unit to assign a level to at least one element of the gaming system for a predefined period of time and to enable the at least one user to play the electronic game in a physical gaming environment with the improved user experience.

The advantages of the present method are thus identical to those disclosed above in connection with the present gaming system and the embodiments listed above in connection with the system apply mutatis mutandis to the method.

According to a third aspect, there is provided a computer program product comprising a non-transitory computer-readable storage medium having computer-readable instructions stored thereon, the computer-readable instructions being executable by a computerized device comprising processing hardware to execute the above method.

The advantages of the present computer program product are thus identical to those disclosed above in connection with the present gaming system and the embodiments listed above in connection with the system apply mutatis mutandis to the computer program product.

According to a fourth aspect, there is provided a gaming system including a computing arrangement for implementing a set of first rules for compensating at least one element of the gaming system, characterized in that the computing arrangement comprising:

a processor that implements a set of first rules, when in operation, to:
implement a set of modes from an electronic game into a physical gaming environment;
determine, based on a set of second rules of the electronic game, a modification to at least one of:
(a) a first parameter by processing at least one first event, wherein the at least one first event is generated by processing a first information that is sensed by a first sensing arrangement of the at least one gaming device, or
(b) a second parameter by processing at least one second event, wherein the at least one second event is generated by processing a second information that is sensed by a second sensing arrangement of an environmental unit; and
generate commands to implement modifications to at least one of:
(a) the first parameter in the at least one gaming device, or
(b) the second parameter in the environmental unit to compensate the at least one element of the gaming system for a predefined period of time and to enable the at least one user to play the electronic game in the physical gaming environment with the improved user experience.

According to an embodiment, the set of first rules are programmable according to the electronic game.

The advantages of the above gaming system are thus identical to those disclosed above in connection with the present gaming system and the embodiments listed above in connection with the present gaming system apply mutatis mutandis to the above gaming system.

In an embodiment, the present gaming system may be used for any electronic game to recreate that electronic game in the physical gaming environment. For example, in an electronic game where the objective is to escape from a room, also known as room escape or escape game, which requires a user to escape from imprisonment by exploiting their surroundings. The present gaming system may emulate the electronic game in the physical gaming environment and if the user solves a riddle/problem, the gaming system receives a signal and responds with a compensation for solving the riddle/problem to the user and delivers the next riddle automatically. In an embodiment, the gaming system rewards the user when a particular riddle is solved or penalizes the user if the particular riddle is not solved. The gaming system may modify an element of the environment through the use of pressure sensors which activate a gate located in a floor which delivers a key or "tool" to the user. For example, the elements in a Mario Kart game are: tools, modification of the environment (e.g. increasing or reducing an allocated time).

In an example embodiment, in a shooter game, where the objective is to (i) capture a flag from another team, (ii) kill all the members of the opposite team or (iii) race another team using a map, the gaming system may implement the rules of the game (e.g. the set of second rules) and emulate the game in a physical gaming environment using sensors and a communication network. The gaming system may use sensors to block arms or access gates, detect players in specific zones, detect a running count of shots performed by each user, track hits versus missed hits or track shots received by each user and may automatically enforce the rules of the game. The gaming system may generate game effects like sound explosions, smoke, light effects, etc. with the help of an audio system, a smoke generator and lightings.

Embodiments of the present disclosure may enable the at least one user users to play the electronic game in the physical gaming environment with the improved user experience. Embodiments of the present disclosure may implement the set of second rules and elements of the electronic game to recreate the electronic game in the physical gaming environment. Embodiments of the present disclosure may implement the set of first rules to assign or strength an element (e.g. a tool) of the gaming system when playing, which enables a unique compensation to make the electronic game more competitive.

DETAILED DESCRIPTION OF THE DRAWINGS

FIG. 1 is a schematic illustration of a gaming system in accordance with an embodiment of the present disclosure. The gaming system comprises a computing arrangement 102 that is connected, when in operation, via a data communication network arrangement 104 to an environmental unit 108 and at least one gaming device 112 that is spatially local to the environmental unit 108. The computing arrangement 102 includes a processor 106. The environmental unit 108 includes a second sensing arrangement 110 and the at least one gaming device 112 includes a first sensing arrangement 114. The functions of these parts are as has been described above.

Figure 2:
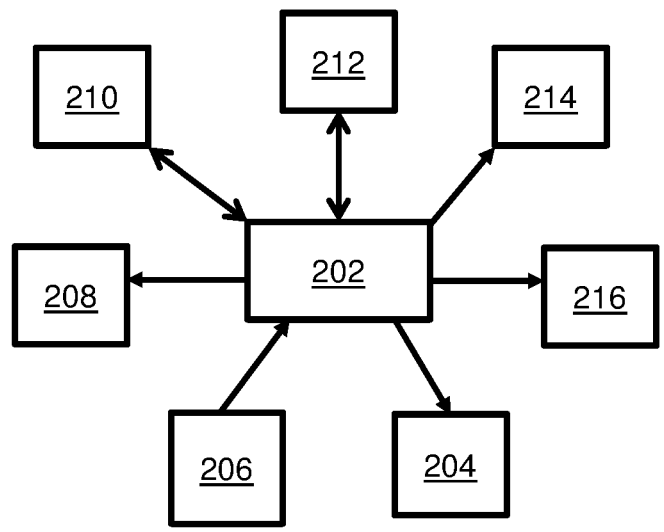
FIG. 2 is a functional block diagram of at least one gaming device in accordance with an embodiment of the present disclosure.

FIG. 2 is a functional block diagram of at least one gaming device in accordance with an embodiment of the present disclosure. The functional block diagram of the at least one gaming device comprises a first microprocessor 202, a first sensing arrangement 204, at least one element 206, a battery 208, a motor 210, a first communication module 212, a speaker 214 and a display 216. The battery 208 may provide power to the first sensing arrangement 204, the first microprocessor 202, a motor 210, a speaker 214 and a display 216. The motor 210 may drive the at least one gaming device. The speaker 214 may provide sound effects while playing the electronic game. The functions of other parts are as has been described above.

Figure 3:
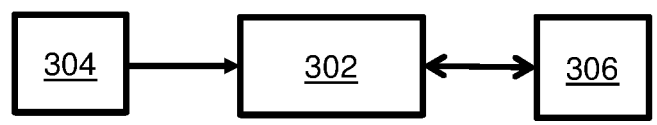
FIG. 3 is a functional block diagram of an environmental unit in accordance with an embodiment of the present disclosure.

FIG. 3 is a functional block diagram of an environmental unit in accordance with an embodiment of the present disclosure. The functional block diagram of the environmental unit comprises a second microprocessor 302, a second sensing arrangement 304 and a second communication module 306. The functions of these parts are as has been described above.

Figure 4:
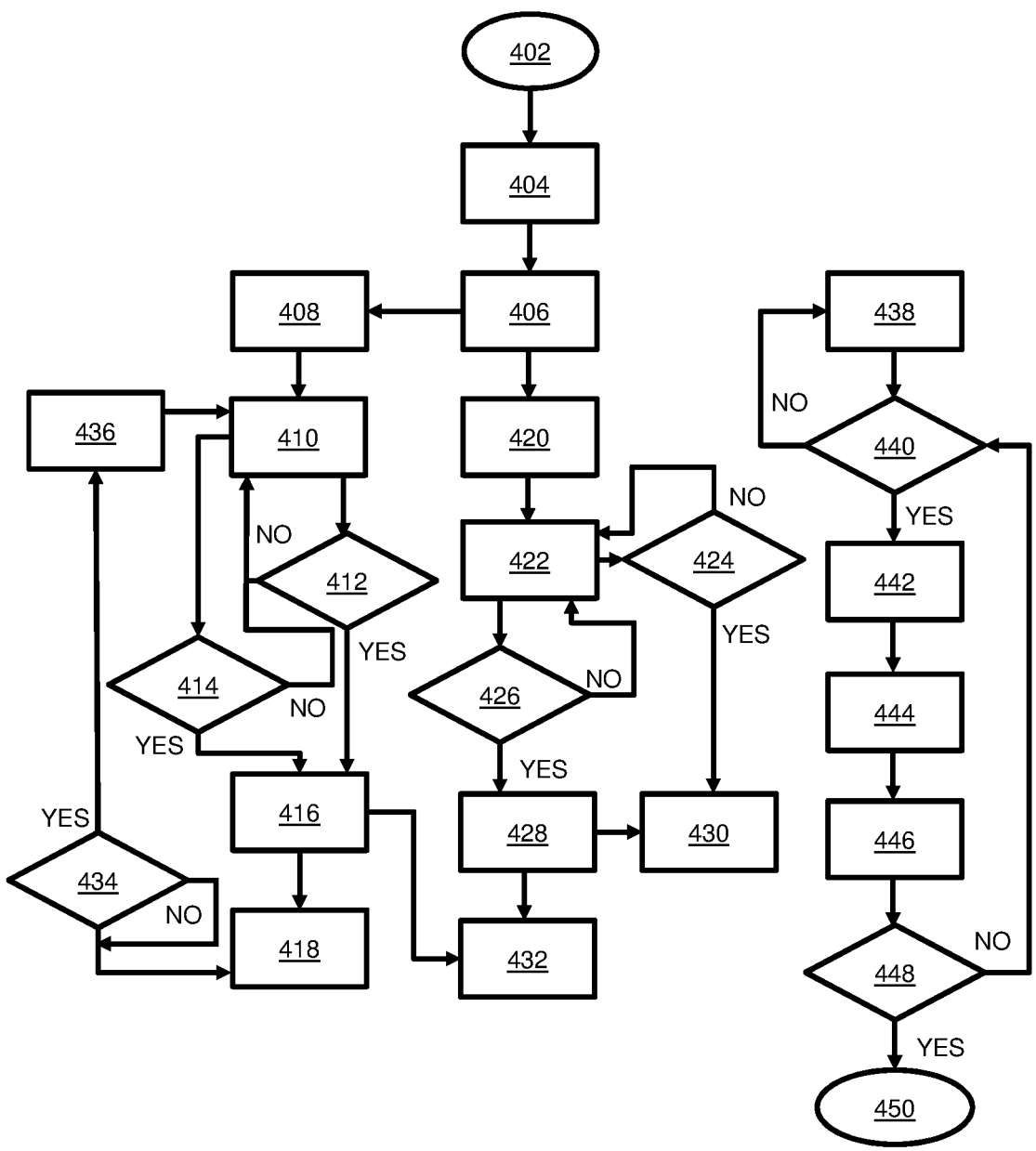
FIG. 4 is a flowchart illustrating steps of a method for (of) emulating an electronic game in a physical gaming environment using a gaming system in accordance with an embodiment of the present disclosure.

FIG. 4 is a flowchart illustrating steps of a method for (of) emulating an electronic game in a physical gaming environment using a gaming system in accordance with an embodiment of the present disclosure. At a step 402 of the method of emulating, an electronic game is started. At a step 404 of the method of emulating, a set of first parameters for at least one gaming device and a set of second parameters for an environment unit are predefined. At a step 406 of the method of emulating, the electronic game is initiated. At a step 408 of the method of emulating, a first sensing arrangement of the at least one gaming device is turned ON for sensing a first information including inputs from at least user while playing the electronic game. At a step 410 of the method of emulating, the at least one gaming device is in a standby mode. At a step 412 of the method of emulating, it is checking whether the first information including the inputs from the at least user is obtained while playing the electronic game. If YES go to step 416 else go to step 410. At a step 414 of the method of emulating, it is checking whether first commands are received from a computing arrangement. If YES go to step 416 else go to step 410. At a step of 416 of the method of emulating, at least one first event is generated by processing the first information. At a step 418 of the method of emulating, a first parameter is modified based on the first commands received from the computing arrangement. At a step 420 of the method of emulating, a second sensing arrangement of an environmental unit is turned ON for sensing a second information associated with the at least one gaming device while playing the electronic game. At a step 422 of the method of emulating, the environmental unit is in a standby mode. At a step 424 of the method of emulating, it is checking whether second commands are received from the computing arrangement. If YES go to step 430 else go to step 422. At a step 426 of the method of emulating, it is checking whether the second information associated with the at least one gaming device is obtained while playing the electronic game. If YES go to step 428 else go to step 422. At a step 428 of the method of emulating, at least one second event is generated by processing the second information associated with the at least one gaming device. At a step 430 of the method of emulating, a second parameter is modified based on the second commands received from the computing arrange-ment. At a step 432 of the method of emulating, the at least one first event and the at least one second event are communicated as inputs to the computing arrangement. At a step 434 of the method of creating, it is checking whether a delay is occurred in modifying the first parameter. If YES go to step 436 else go to step 418. At a step 436 of the method of emulating, the set of first parameters for the at least one gaming device is predefined. At a step 438 of the method of emulating, the computing arrangement is in a standby mode. At a step 440 of the method of emulating, it is checking whether the at least one first event and the at least one second event is received from the at least one gaming device and the environmental unit. If YES go to step 442 else go to step 438. At a step 442 of the method of emulating, a modification to at least one of (a) a first parameter by processing the at least one first event or (b) a second parameter by processing the at least one second event based on a set of rules of the electronic game is determined and the commands are generated to implement modifications to at least one of (i) the first parameter in the at least one gaming device or (ii) the second parameter in the environmental unit for compensating at least one element of the gaming system for a predefined period of time and for enabling the at least one user to play the electronic game in the physical gaming environment with the improved user experience. At a step 444 of the method of emulating, the commands are communicated to the at least one gaming device using a third communication module. At a step 446 of the method of emulating, the commands are communicated to the environmental unit using the third communication module. At a step 448 of the method of emulating, it is checking whether a winner of the electronic game is determined. If YES go to step 450 else go to step 440. At a step 450 of the method of emulating, the electronic game is ended.

Figure 5:
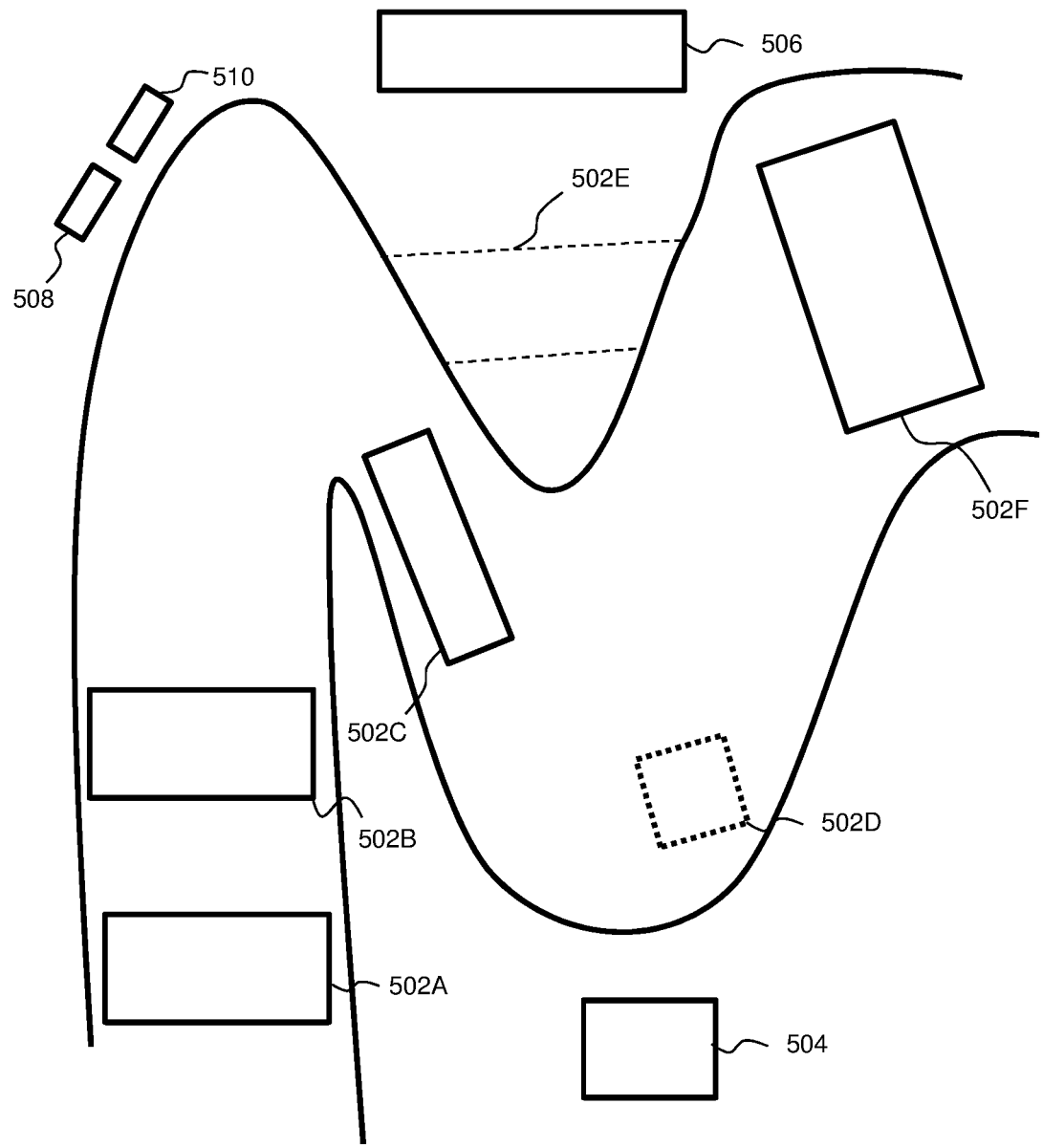
FIG. 5 is an exemplary view of a physical gaming environment of an electronic game comprising a track in accordance with an embodiment of the present disclosure.

FIG. 5 is an exemplary view of a physical gaming environment of an electronic game comprising a track in accordance with an embodiment of the present disclosure. The exemplary view of the physical gaming environment may comprise a plurality of zones 502A-F. Each of the plurality of zones 502A-F comprises a plurality of sensors (not shown in FIG. 5) for sensing second information associated with at least one gaming device. The exemplary view of the physical gaming environment may further comprise a computing arrangement 504, a display 506, a light system 508 and a multimedia system 510. For example, the plurality of sensors at each of the plurality of zones 502A-F tracks a user position and triggers events as inputs to the computing arrangement 504. The plurality of zones 502A-F may comprise a time measurement zone 502A, an admission area 502B, a speed zone 502C, a braking area 502D, a shortcut zone 502E and an obstruction zone 502F and may comprise others zones according to an electronic game. Each zone comprises the plurality of sensor at the track which may collect information tracked by an environment module. In one embodiment, the speed zone 502C and the braking area 502D may enforce speed zones to reduce or increase a speed of the at least one gaming device. The display 506 in the track provides a status of the electronic game or a score of a user to users and/or spectators. The light system 508 and multimedia system 510 with speakers may provide sound and video effects, and other effects (e.g. fog, water, etc.).

Figure 6:
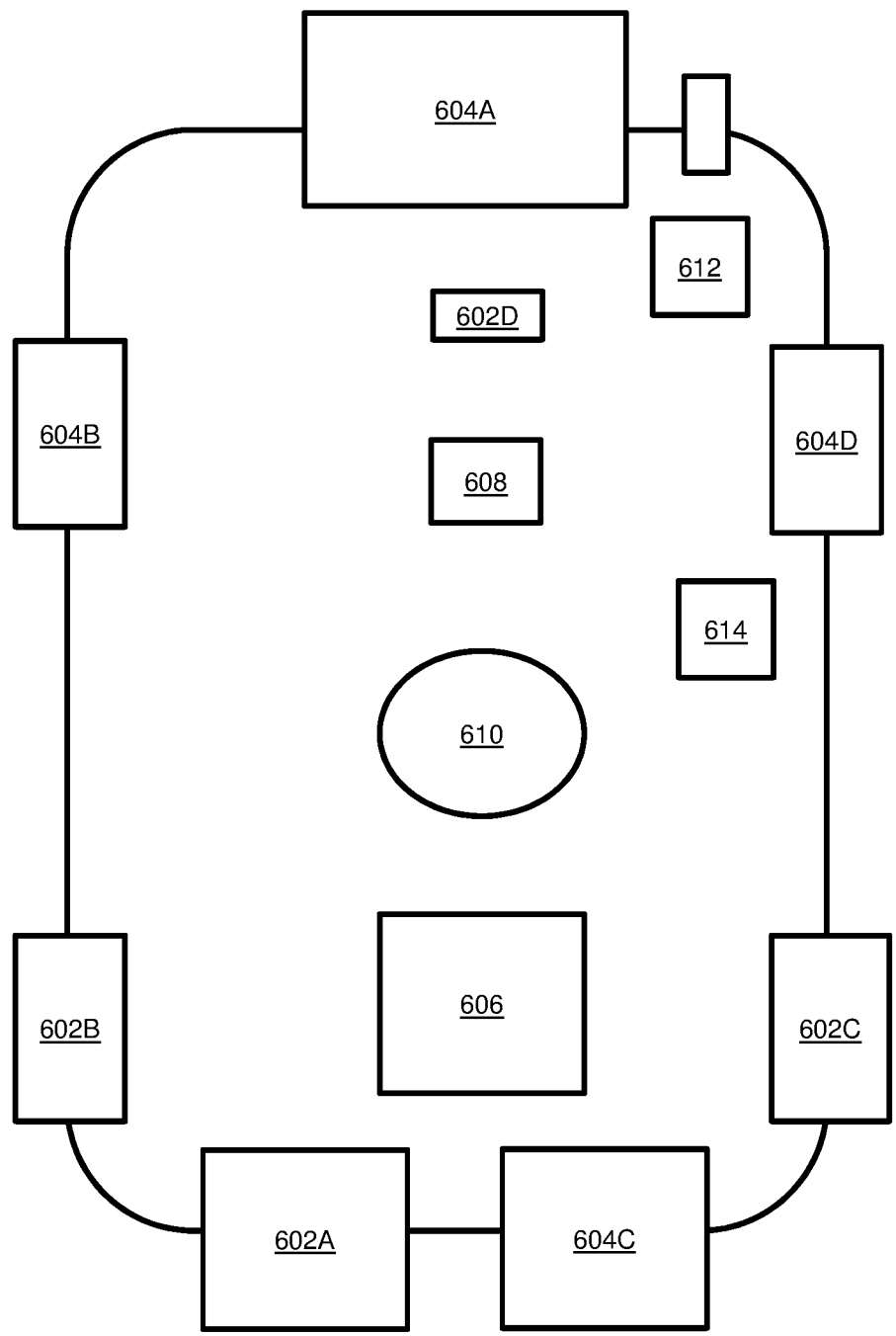
FIG. 6 is an exemplary view that illustrates an implementation of a gaming device that is used by at least one user in a game in accordance with an embodiment of the present disclosure.
Figure 7:
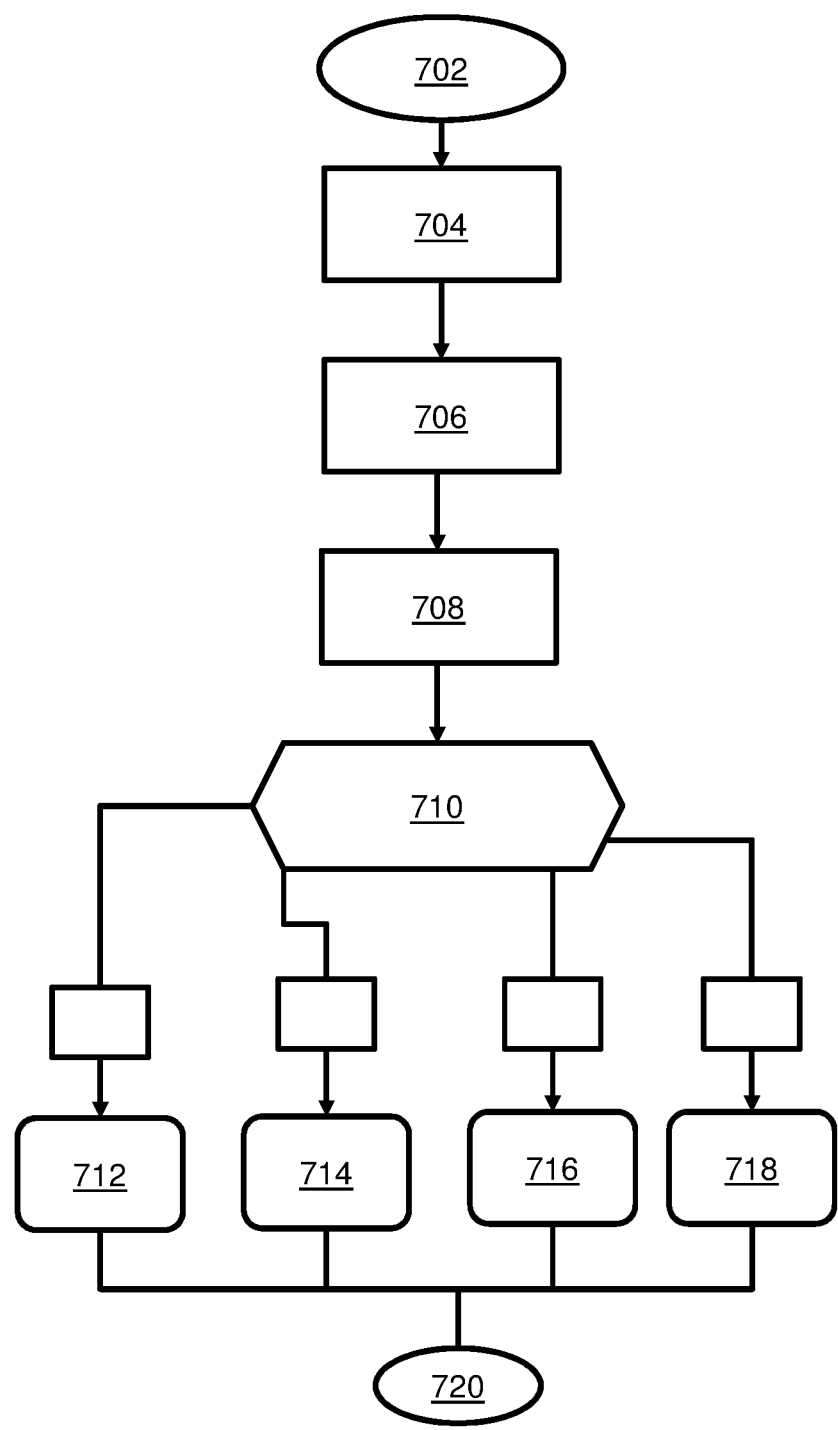
FIG. 7 is a flowchart illustrating steps of a method for (of) implementing a set of first rules for compensating at least one element of a gaming system in accordance with an embodiment of the present disclosure.

FIG. 6 is an exemplary view that illustrates an implementation of a gaming device (e.g. a kart) that is used by at least one user in a game (e.g. Kart game) in accordance with an embodiment of the present disclosure. The gaming device is implemented in a physical gaming environment to enable the at least one user to play the gaming device in the physical gaming environment with the improved user experience. The gaming device comprises one or more sensors 602A-D, one or more actuators 604A-C, a first microprocessor 606, a display 608, a motor 610, an accelerator 612 and an actuator button 614. The actuator button 614 activates the actuators 604A-C. The functions of other parts are as has been described above. The display 608 indicates the at least one user whether he has been granted a tool or element (e.g. a special power, a shoot at other user or causing the front-runner to slow down) or whether he is being penalized as he fell into a trap FIG. 7[A4] is a flowchart illustrating steps of a method for (of) implementing a set of first rules for compensating at least one element of a gaming system in accordance with an embodiment of the present disclosure. At a step 702 of the method of implementing, a compensation process is started. At a step 704 of the method of implementing, an acquisition zone is identified. At a step 706 of the method of implementing, a position of a gaming device in a track of a physical gaming environment is identified. At a step 708 of the method of implementing, a time at which the gaming device crosses the acquisition zone is evaluated. At a step 710 of the method of implementing, a set of first rules (e.g. compensation rules) are implemented to compensate a user of the gaming device based on the position of the gaming device in the track. At a step 712 of the method of implementing, the tools/elements of the gaming device having a low impact on an electronic game are identified. At a step 714 of the method of implementing, the tools/elements of the gaming device having a medium impact on the electronic game are identified. At a step 716 of the method of implementing, the tools/elements of the gaming device having half impact on the electronic game are identified. At a step 718 of the method of implementing, the tools/element of the gaming device having a high impact on the electronic game are identified. At a step 720 of the method of implementing, the compensation process is ended.

Figure 8A:
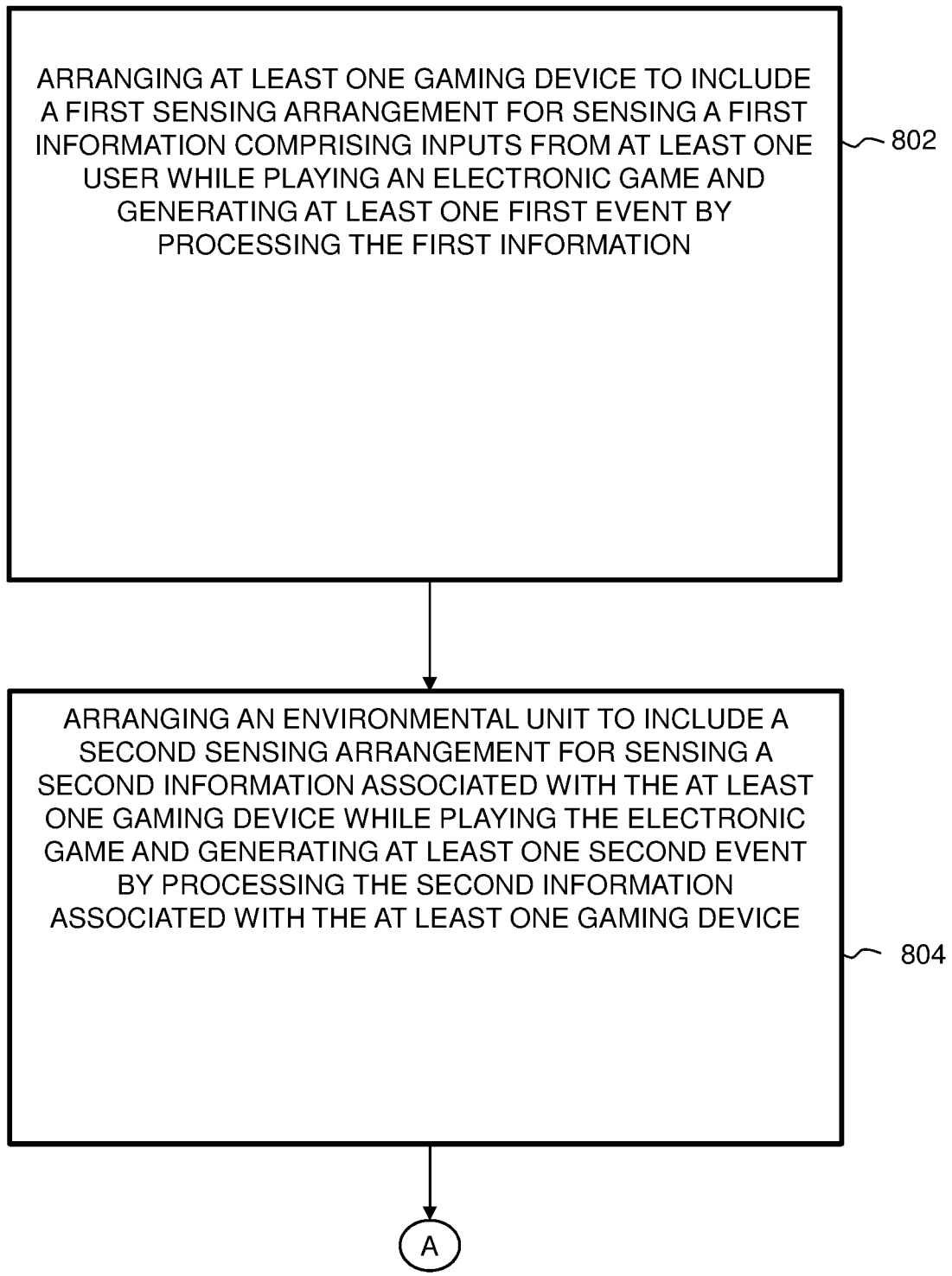
FIGS. 8A to 8B are flow diagrams illustrating steps of a method that is performed by a gaming system in accordance with an embodiment of the present disclosure.
Figure 8B:
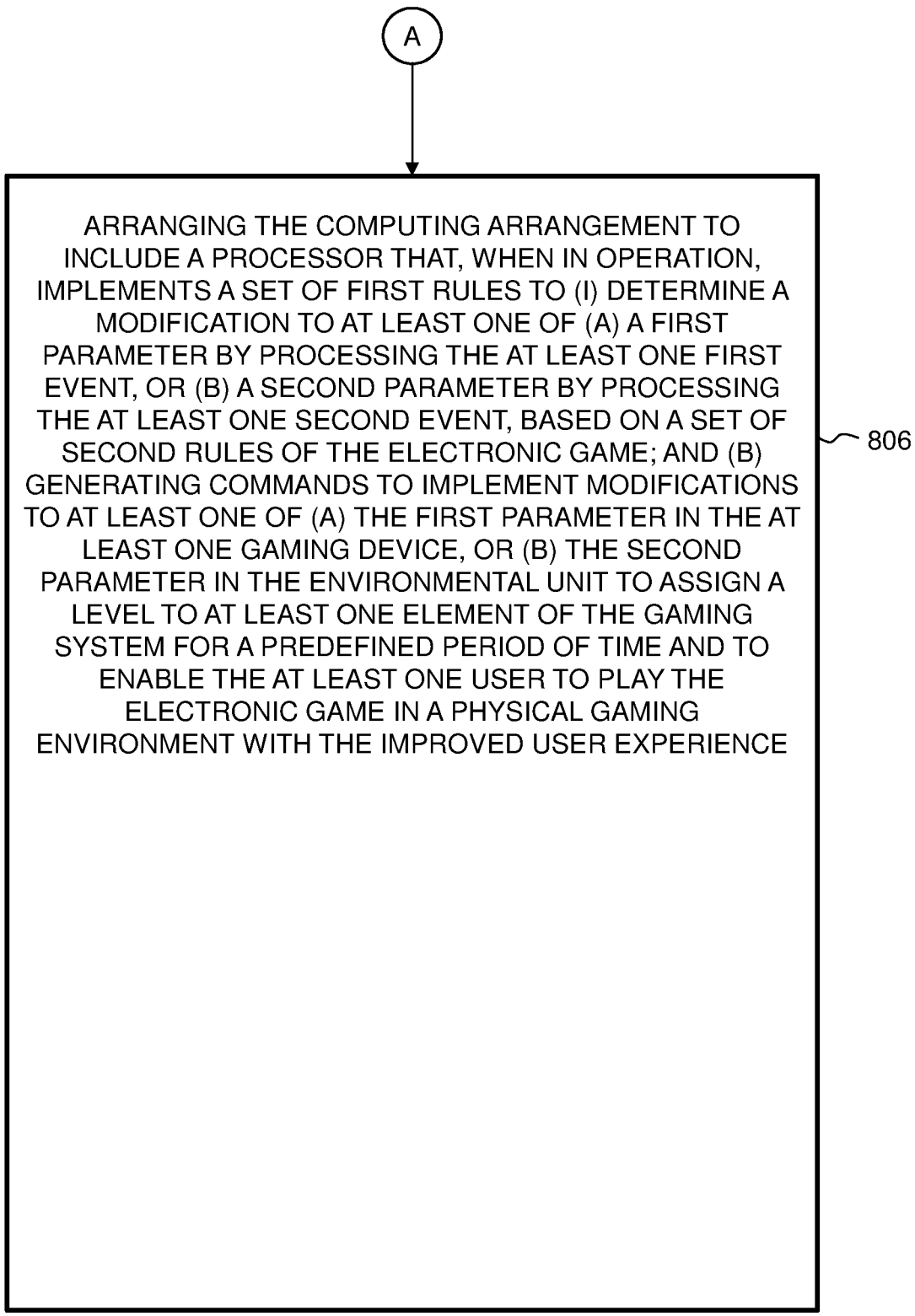

FIGS. 8A to 8B are flow diagrams illustrating steps of a method that is performed by a gaming system in accordance with an embodiment of the present disclosure. At a step 802, at least one gaming device is arranged to include a first sensing arrangement for sensing a first information comprising inputs from at least one user while playing an electronic game and for generating at least one first event by processing the first information. At a step 804, an environmental unit is arranged to include a second sensing arrangement for sensing a second information associated with the at least one gaming device while playing the electronic game and for generating at least one second event by processing the second information associated with the at least one gaming device. At a step 806, the computing arrangement is arranged to include a processor that, when in operation, implements a set of first rules to (i) determine a modification to at least one of (a) a first parameter by processing the at least one first event, or (b) a second parameter by processing the at least one second event, based on a set of second rules of the electronic game, and (ii) generate commands to implement modifications to at least one of (a) the first parameter in the at least one gaming device, or (b) the second parameter in the environmental unit to assign a level to at least one element of the gaming system for a predefined period of time and to enable the at least one user to play the electronic game in a physical gaming environment with the improved user experience.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A gaming system including a computing arrangement that is connected, when in operation, via a data communication network arrangement to an environmental unit and at least one gaming device that is spatially local to the environmental unit, characterized in that the gaming system is implemented in an environment to emulate an electronic game to play in a physical gaming environment by its one or more users, wherein the gaming system is arranged such that:

the at least one gaming device includes a first sensing arrangement for sensing a first information comprising inputs from at least user while playing the electronic game and generating at least one first event by processing the first information;

the environmental unit includes a second sensing arrangement for sensing a second information associated with the at least one gaming device while playing the electronic game and generating at least one second event by processing the second information associated with the at least one gaming device, wherein the at least one first event and the at least one second event are provided as input to the computing arrangement; and the computing arrangement including a processor that, when in operation, implements a set of first rules to:

determine a modification to at least one of:

(a) a first parameter by processing the at least one first event, or (b) a second parameter by processing the at least one second event, based on a set of second rules of the electronic game, wherein the set of first rules comprises programmable compensation rules which cause a hardware reconfiguration of the gaming system based on a status of the electronic game to make the electronic game more competitive; and generate commands to implement modifications to at least one of:

(a) the first parameter in the at least one gaming device, or (b) the second parameter in the environmental unit for compensating at least one element of the gaming system for a predefined period of time and for enabling the at least one user to play the electronic game in the physical gaming environment with an improved user experience;

wherein the processor predefines a set of first parameters for the at least one gaming device and a set of second parameters for the environment unit and wherein the processor enables the set of first parameters, the set of second parameters, the first sensing arrangement and the second sensing arrangement in a standby mode before the electronic game starts.

2. A gaming system of claim 1, wherein the second sensing arrangement is implemented in a plurality of zones of the physical gaming environment and wherein each of the plurality of zones comprises at least one sensor that detects a physical parameter of the at least one gaming device or the at least one user to generate the second information.

3. A gaming system of claim 1, wherein the set of first rules implement a set of modes from the electronic game into the physical gaming environment.

4. A gaming system of claim 1, wherein the processor enforces the set of second rules of the electronic game and monitors a progress of the electronic game to determine a winner of the electronic game.

5. A gaming system of claim 1, wherein the second information comprises at least one of a speed, a position or a status of the at least one gaming device.

6. A gaming system of claim 1, wherein that the first parameter comprises a parameter associated with the at least one element of the gaming system and the element comprises at least one of at least one of speed, gun, shield, power, attack or defense items or rewards.

7. A gaming system of claim 1, wherein the second parameter comprises an environmental parameter associated with the physical gaming environment.

8. A gaming system of claim 1, wherein the at least one gaming device comprises a display that indicates whether the at least one user has been provided a new element or penalized when the at least one user fell into a trap.

9. A gaming system of claim 1, wherein that the processor synchronizes the first event and the second event.

10. A method of using a gaming system of claim 1, wherein the method comprising:
arranging at least one gaming device to include a first sensing arrangement for sensing a first information comprising inputs from at least one user while playing an electronic game and generating at least one first event by processing the first information;
arranging an environmental unit to include a second sensing arrangement for sensing a second information associated with the at least one gaming device while playing the electronic game and generating at least one second event by processing the second information associated with the at least one gaming device, wherein the at least one first event and the at least one second event are provided as input to a computing arrangement; and
arranging the computing arrangement to include a processor that, when in operation, implements a set of first rules to:
determine a modification to at least one of:
(a) a first parameter by processing the at least one first event, or
(b) a second parameter by processing the at least one second event, based on a set of second rules of the electronic game,
wherein the set of first rules comprises programmable compensation rules which cause a hardware reconfiguration of the gaming system based on a status of the electronic game to make the electronic game more competitive; and
generate commands to implement modifications to at least one of:
(a) the first parameter in the at least one gaming device, or
(b) the second parameter in the environmental unit to assign a level to at least one element of the gaming system for a predefined period of time and to enable the at least one user to play the electronic game in a physical gaming environment with an improved user experience;
wherein the processor predefines a set of first parameters for the at least one gaming device and a set of second parameters for the environment unit and wherein the processor enables the set of first parameters, the set of second parameters, the first sensing arrangement and the second sensing arrangement in a standby mode before the electronic game starts.

11. A computer program product comprising a non-transitory computer-readable storage medium having computer-readable instructions stored thereon, the computer-readable instructions being executable by a computerized device comprising processing hardware to execute the method of claim 10.

12. A gaming system including a computing arrangement for implementing a set of first rules for compensating at least one element of the gaming system, characterized in that the computing arrangement comprising:
a processor that implements a set of first rules, when in operation, to:
implement a set of modes from an electronic game into a physical gaming environment,
wherein the set of first rules comprises programmable compensation rules which cause a hardware reconfiguration of the gaming system based on a status of the electronic game to make the electronic game more competitive; and
determine, based on a set of second rules of the electronic game, a modification to at least one of:
(a) a first parameter by processing at least one first event, wherein the at least one first event is generated by processing a first information that is sensed by a first sensing arrangement of the at least one gaming device, or
(b) a second parameter by processing at least one second event, wherein the at least one second event is generated by processing a second information that is sensed by a second sensing arrangement of an environmental unit; and
generate commands to implement modifications to at least one of:
(a) the first parameter in the at least one gaming device, or
(b) the second parameter in the environmental unit to compensate the at least one element of the gaming system for a predefined period of time and to enable the at least one user to play the electronic game in the physical gaming environment with an improved user experience;
wherein the processor predefines a set of first parameters for the at least one gaming device and a set of second parameters for the environment unit and wherein the processor enables the set of first parameters, the set of second parameters, the first sensing arrangement and the second sensing arrangement in a standby mode before the electronic game starts.

* * * * *